(12) United States Patent
Metelev et al.

(10) Patent No.: US 9,132,298 B2
(45) Date of Patent: Sep. 15, 2015

(54) DEVICE AND METHOD FOR RESCUING FROM A HIGH-RISE FACILITY

(75) Inventors: Yury Alekseevich Metelev, Moscow (RU); Sergei Vasilyevich Kulik, Moscow (RU)

(73) Assignees: OOO "KOSMICHESKIE SISTEMY SPASENIYA", Khimki (RU); Andrei V. Filatov, Korolev (RU)

( * ) Notice: Subject to any disclaimer, the term of this patent is extended or adjusted under 35 U.S.C. 154(b) by 243 days.

(21) Appl. No.: 13/985,022

(22) PCT Filed: Feb. 13, 2012

(86) PCT No.: PCT/RU2012/000098
§ 371 (c)(1),
(2), (4) Date: Aug. 12, 2013

(87) PCT Pub. No.: WO2012/112078
PCT Pub. Date: Aug. 23, 2012

(65) Prior Publication Data
US 2015/0108277 A1     Apr. 23, 2015

(30) Foreign Application Priority Data

Feb. 15, 2011 (RU) ................................ 2011105298

(51) Int. Cl.
*A62B 1/22* (2006.01)
*B64D 17/72* (2006.01)

(52) U.S. Cl.
CPC .. *A62B 1/22* (2013.01); *B64D 17/72* (2013.01)

(58) Field of Classification Search
CPC ........ B64D 17/72; B64D 25/12; B64D 25/18; A62B 1/22; B64C 25/26
See application file for complete search history.

(56) References Cited

U.S. PATENT DOCUMENTS

| | | | | |
|---|---|---|---|---|
| 3,921,944 A | * | 11/1975 | Morrison | 244/138 R |
| 6,237,875 B1 | * | 5/2001 | Menne et al. | 244/138 R |
| 6,264,144 B1 | * | 7/2001 | Thornton | 244/159.2 |
| 6,607,166 B1 | * | 8/2003 | Pichkhadze et al. | 244/138 R |
| 9,027,886 B1 | * | 5/2015 | Mechels | 244/151 R |
| 2011/0225695 A1 | * | 9/2011 | Cheng | 2/2.14 |
| 2011/0315475 A1 | * | 12/2011 | Filatov et al. | 182/3 |

FOREIGN PATENT DOCUMENTS

WO    WO 2008127143 A1 *  10/2008
WO    WO 2010120211 A1 *  10/2010

* cited by examiner

*Primary Examiner* — Rob Swiatek
*Assistant Examiner* — Richard R Green
(74) *Attorney, Agent, or Firm* — Bardmesser Law Group (57) ABSTRACT

Devices and methods for rescuing people from high-rise facilities, for example, upper floors of multi-storey buildings. A rescue device from a high-rise building includes several flexible spokes interconnected on one end to form a pyramidal figure, wherein the spokes are located on the edges, an aerodynamic deceleration element fastened to the spokes, connectors located between the adjacent flexible spokes, in so doing the connectors are located at some distance from the ends of the flexible spokes, a buffer element fastened in a point of connection of the flexible spokes and a means of fastening an object to be rescued fastened in the point of connection of the flexible spokes on the other side with respect to the buffer element, in so doing each of the flexible spokes is embodied as curved sideways from a central axis of the device.

19 Claims, 11 Drawing Sheets

DEVICE AND METHOD FOR RESCUING FROM A HIGH-RISE FACILITY

CROSS-REFERENCE TO RELATED APPLICATIONS

This application is a US National Phase of PCT Application No. PCT/RU2012/000098, filed on Feb. 13, 2012, which claims priority to RU 2011105298, filed on Feb. 15, 2011, which are all incorporated by reference herein in their entirety.

FIELD OF THE INVENTION

The present invention relates to devices and methods for rescuing, particularly to the devices and methods for rescuing people from high-rise facilities, for example, upper floors of multi-storey buildings. The device and method according to the present invention can be used for individual rescue of a person during an emergency escape from a high-rise building, for example, a multi-storey building, during a fire or other emergency situation, when evacuation from a high-rise building using traditional methods is impossible.

BACKGROUND OF THE INVENTION

Russian Federation Patent 2399389 discloses a device for emergency descent of a person from a high-rise building fastened to the back of a person, including a central toroidal chamber being inflated using an independent gas-filling source to which a membrane is attached and which is connected on one side to inflatable spokes which, upon inflation, form a cone, and which are interconnected by inflatable connectors, and are connected on the other side to an inflatable damping structure which has a toroidal inflatable chamber, which in relation to the central toroidal chamber is located opposite to the arrangement of the inflatable spokes interconnected by connectors. The toroidal inflatable chamber communicates with the central toroidal chamber by the spokes being inflated, and embodied by diameter which is greater than the diameter of the central toroidal chamber and is less than the diameter of the base of the cone, which is formed by spokes which are straightened out upon inflation and are interconnected by connectors. An air-impermeable perforated fabric is stretched between the spokes the toroidal chambers, or the spokes together with the toroidal chambers are covered by air-impermeable perforated protective coverings in order to form a conical deceleration shield in the form of two truncated conical pyramids with a common base in the central toroidal chamber zone and with great bases having different diameters and oppositely directed. A membrane is stretched in the toroidal chamber with damping structure and the air-impermeable fabric is embodied as perforated and the independent gas-filling source communicates with one of the toroidal inflatable chambers or with one of the inflatable spokes, and the internal volumes of all the toroidal chambers and spokes communicate with one another and form a single closed volume.

Shaping of a fly-away trajectory is one of the most important aspects of rescuing people, as is known in the prior art.

A step of shaping of the fly-away trajectory begins immediately following separation of the rescue device together with a person to be rescued, from the high-rise building.

During this step, moving away of the device, together with the person to be rescued, for some distance from the high-rise building, and orientation of the device in relation to earth and its stabilization occurs. The device finally goes into an operating position, notably, it assumes its final shape.

The device in the operating position must be oriented in relation to earth in the following way: a damping device is directed down and the inflatable spokes arranged in a cone upon inflation and interconnected by inflatable connectors are directed up. In such position smooth descent of the rescue device together with the person to be rescued occurs. Smooth descent and a low speed of descent are provided at the expense of deceleration of the device in the atmosphere.

Upon shaping of the fly-away trajectory, a range of moving away of the device, together with the person to be rescued, for some distance from the high-rise building is of great importance. The greater is a distance for which the rescue device has moved away from building, the higher is a probability of successful rescue.

In doing so, a minimum distance of moving away from the high-rise building exists for the above mentioned device. If the range of moving away of the rescue device is less than the minimum distance the orientation of the device and correspondingly, descent in a normal mode are impossible.

In the known rescue device, the inflatable spokes which, upon inflation, are arrangeable in a cone and rest against a wall of the high-rise building. At the expense of effort exerted by the present spokes on the wall of the high-rise building shaping of the fly-away trajectory occurs.

However, the effort applied by the spokes in accordance with the known technical solution is deficient for guaranteed shaping of the fly-away trajectory of the rescue device. In some cases, incomplete shaping of the fly-away trajectory is possible, and descent in an abnormal mode is possible.

To increase the effort being applied by the spokes, an increase in geometric dimensions thereof is required. The increase in geometric dimensions leads to increase in an interior volume of the rescue device, which requires use of a more powerful gas-filling source, an increase in a weight of the rescue device, and an increase in its volume in a folded up (inactive) state. Increase in the weight and volume is objectionable as the present type of the rescue device is intended for use in stress situations.

SUMMARY OF THE INVENTION

The present invention is based on the problem of creating a rescue device from a high-rise building which provides high reliability level of the rescue device from the high-rise building and high probability of a safe landing, in particular, a high probability of correct shaping of the fly-away trajectory and descent in a normal mode and high indices of reducing speed of descent without a substantial increase in the weight and interior volume of the device, and addressing the problem of providing a greater distance from the high-rise building.

This problem is accomplished by using a rescue device comprising several resilient for bending (flexible) spokes interconnected on one end to form a pyramidal figure, where the spokes are located on the edges, an aerodynamic deceleration element fastened to the spokes, and connectors located between adjacent flexible spokes. The connectors are located at some distance from the ends of the flexible spokes. A buffer element is fastened in a point of connection of the flexible spokes and a means of fastening an object to be rescued fastened in the point of connection of the flexible spokes on the other side with respect to the buffer element. Each of the flexible spokes is curved sideways from a central axis of the device.

The flexible spokes interconnected to form the pyramidal figure and the connectors between the spokes form a frame (carcass) where the aerodynamic deceleration element is located. Rigidity of a construction is provided by the connectors between the spokes. The elements together provide deceleration of the rescue device during flight, and provide for a smooth descent of the device with a determined speed of descent. The buffer element provides damping of speed of descent upon landing.

A curved shape of the flexible spokes provides a greater repulsive force of the rescue device and correspondingly, a greater moving away of the rescue device, high probability of correct shaping of the fly-away trajectory, and, as a result, a high reliability level of the rescue device and a high probability of a safe landing.

Preferably, the flexible spokes and the connectors represent inflatable elements and the rescue device additionally comprises at least one gas-filling means to fill the flexible spokes and the connectors.

Using the inflatable elements provides a small volume of the rescue device in the folded up (inactive) state. Moreover, the flexible spokes and the connectors can have a single interior volume. This provides a possibility to use a single gas-filling means.

Deceleration shields fastened to the flexible spokes between the adjacent flexible spokes can be used as the aerodynamic deceleration element. Parachute domes fastened to the flexible spokes between the adjacent flexible spokes can also be used as an aerodynamic deceleration element.

Preferably, the flexible spokes are interconnected through a connection element, representing a toroidal chamber, and the buffer element is embodied as several inflatable spokes fastened to the connection element and directed opposite to the flexible spokes. The ends of the inflatable spokes are interconnected using non-stretchable or low-stretchable connecting elements.

The toroidal chamber serves as a basic connecting and force element and provides a rigidity of a frame of the rescue device, along with the connectors.

The non-stretchable or low-stretchable connecting elements of the spokes of the buffer element do not allow the buffer element to become deformed with a loss of its buffer properties upon landing i.e., they essentially provide a constant shape of the buffer element at the moment of landing in doing so they have small weight that means less speed of descent and correspondingly, improvement of the reliability of the rescue device and increasing a probability of a safe landing.

Preferably, non-stretchable or low-stretchable material serving as the non-stretchable or low-stretchable connecting elements is fastened to the ends of the inflatable spokes of the buffer device.

It is also preferable that the connecting element represents an inflatable. All the inflatable elements of the device have a single common volume, and the device additionally comprises only one gas-filling means to fill all the inflatable elements of the rescue device.

This is also solved by using the rescue device comprising several flexible spokes, and the connecting element. The flexible spokes are adjoined on one side to the connecting element, the aerodynamic deceleration element fastened to the flexible spokes, and the connectors located between the adjacent flexible spokes. The connectors are located at some distance from the ends of the flexible spokes. The means of fastening the object to be rescued are fastened to the connecting element and the buffer element is adjoined to the connecting element on the other side with respect to the flexible spokes. Each of the flexible spokes is curved sideways from the central axis of the device.

The flexible spokes, the connecting element and the connectors between the spokes form a frame wherein the aerodynamic deceleration element is located. Rigidity of a construction is provided by the connectors between the spokes and the connecting element. The elements together provide deceleration of the rescue device during a flight and provide the smooth descent of the device with a determined speed of descent. The buffer element provides damping of speed of descent upon landing.

The curved shape of the flexible spokes provides a greater repulsive force of the rescue device and correspondingly, a greater moving away of the rescue device from the building, a high probability of correct shaping of the flight trajectory, and, as a result, a high reliability level of the rescue device and a high probability of a safe landing.

Preferably, the flexible spokes, the connectors and the connecting element represent inflatable elements and the rescue device additionally comprises at least the one gas-filling means to fill the flexible spokes and the connectors.

Using the inflatable elements provides for a small volume of the rescue device in a folded up (inactive) state. Moreover, the flexible spokes and the connectors can have single common interior volume. This provides the possibility to use the one gas-filling means.

The deceleration shields fastened to the flexible spokes between the adjacent flexible spokes can be used as the aerodynamic deceleration element. The parachute domes fastened to the flexible spokes between the adjacent flexible spokes can be also used as the aerodynamic deceleration element.

Preferably, the connecting element is made as a toroidal chamber, and the buffer element is embodied as several inflatable spokes fastened to the connection element and directed opposite to the flexible spokes. The ends of the inflatable spokes of the buffer element are interconnected using non-stretchable or low-stretchable connecting elements.

The non-stretchable or low-stretchable connecting elements of the spokes of the buffer element do not allow the buffer element to become deformed with a loss of its buffer properties upon landing, i.e., they essentially provide a constant shape of the buffer element at the moment of landing. In doing so, they have a small weight, which means less speed of descent and improvement in the reliability of the rescue device from a high-rise building and increasing a probability of a safe landing.

Preferably, the non-stretchable or low-stretchable material serving as the non-stretchable or low-stretchable connecting elements is fastened to the ends of the inflatable spokes of the buffer device.

It is also preferable that the connecting element represents an inflatable element, in doing so all the inflatable elements of the device have a single common volume and the device additionally comprises a single gas-filling means to fill all the inflatable elements of the rescue device.

This problem is also solved by using the rescue device comprising several flexible spokes and the toroidal chamber. The flexible spokes are adjoined on one side to the toroidal chamber, the aerodynamic deceleration element fastened to the flexible spokes and the connectors located between the adjacent flexible spokes, in doing so the connectors are located at some distance from the ends of the flexible spokes, the means of fastening the object to be rescued fastened to the toroidal chamber and the buffer element representing the spokes adjoined to the toroidal chamber on the other side with respect to the flexible spokes. Each of the flexible spokes has at least one bend sideways from the central axis of the device and the connectors are located near the bend and the non-stretchable or low-stretchable material is fastened to the ends of the spokes of the buffer device.

The flexible spokes, the toroidal chamber and the connectors between the spokes form a frame where the aerodynamic deceleration element is located. Rigidity of a construction is provided by the connectors between the spokes and the toroidal chamber. The elements together provide deceleration of the rescue device during flight and provide the smooth descent of the device with a determined speed of descent. The buffer element provides damping of speed of descent upon landing.

The curved shape of the flexible spokes provides a greater repulsive force of the rescue device and a greater movement away of the rescue device, a high probability of correct shaping of the fly-away trajectory and as a result high reliability level of the rescue device and a high probability of a safe landing.

The non-stretchable or low-stretchable material fastened to the spokes of the buffer element does not allow the buffer element to become deformed with a loss of its buffer properties upon landing, i.e., it essentially provides a constant shape of the buffer element at the moment of landing. It has a small weight that means less speed of descent and correspondingly, improvement of the reliability of the rescue device and increasing a probability of a safe landing.

Preferably, the flexible spokes, the connectors, the toroidal chamber and the spokes of the buffer element are inflatable and the rescue device additionally comprises at least one gas-filling means to fill the flexible spokes and the connectors.

Using the inflatable elements provides for a small volume of the rescue device in a folded up (inactive) state. Moreover, the flexible spokes, the connectors, the toroidal chamber and the spokes of the buffer device can have single common interior volume. This provides the possibility to use a single gas-filling means.

The deceleration shields fastened to the flexible spokes between the adjacent flexible spokes can be used as the aerodynamic deceleration element. The parachute domes fastened to the flexible spokes between the adjacent flexible spokes can be also used as an aerodynamic deceleration element.

Additionally, each of the flexible spokes can have two bends sideways from the central axis of the device and the connectors are located near the nearest bond to the toroidal chamber.

This problem is also solved by using the buffer device representing a part of the rescue device comprising several inflatable spokes fastened to the connecting element and directed to one side from the connecting element. The ends of the inflatable spokes of the buffer device are interconnected using the non-stretchable or low-stretchable connecting elements.

The non-stretchable or low-stretchable connecting elements of the spokes of the buffer element do not allow the buffer element to become deformed with a loss of its buffer properties upon landing, i.e., they essentially provide a constant shape of the buffer element at the moment of landing. They have small weight that means less speed of descent and correspondingly, improvement of the reliability of the rescue device and increasing a probability of a safe landing.

Preferably, the non-stretchable or low-stretchable material serving as the non-stretchable or low-stretchable connecting elements is fastened to the ends of the inflatable spokes of the buffer device.

The inflatable spokes can also be embodied as curved. The buffer device with curved spokes retains better its shape upon landing. Moreover, it is preferable that the connecting element has a toroidal shape and embodied as inflatable.

This problem is also solved by a method for descent from the high-rise building using the rescue device to be filled with gas, comprising an arrangement of the object to be lowered with the rescue device fastened to it at the edge of the high-rise building, in doing so the rescue device is located from outer side of the high-rise building and fixation of a position of the object to be rescued and means of rescuing in relation to the high-rise building using a means of fixation; initialization a gas source to fill the rescue device with gas or air, opening of a knapsack of a container and stretching of elements of the rescue device; disconnecting the means of fixation with subsequent catapulting of the object to be rescued from the high-rise building upon achievement of a determined degree of filling the rescue device with gas; filling with gas and stretching of the rescue device to an active position and further descent; damping of speed of descent by the buffer element upon landing.

Fixation of the position of the object to be rescued and the means of rescuing in relation to the high-rise building and subsequent disconnecting the means of fixation upon achievement of the determined degree of filling the rescue device with gas makes it possible to form a repulsive force of the device and thereby to impart a much greater momentum to the rescue device together with the object to be rescued. This makes it possible to provide a greater distance from the high-rise building that means shaping of a safer fly-away trajectory and correspondingly, increasing a probability of a safe landing and the reliability of the device.

This problem is also solved by using the device comprising a frame to be filled with gas to which the aerodynamic deceleration element is fastened, at least one source to fill the frame with gas and the means of fixation of the rescue device in relation to the high-rise building, in doing so the rescue device is embodied with a possibility to disconnect the means of fixation upon achievement of the determined degree of filling the frame with gas.

The means of fixation of the position of the object to be rescued and the means of rescuing in relation to the high-rise building and the possibility of its subsequent disconnecting upon achievement of the determined degree of filling, the rescue device with gas makes it possible to form a repulsive force of the device and thereby to impart a much greater momentum to the rescue device together with the object to be rescued. This makes it possible to provide a greater distance from the high-rise building, which means shaping of safer fly-away trajectory and correspondingly, increasing a probability of a safe landing and the reliability of the device.

Additionally, the source to fill with gas can continue filling of the frame of the rescue device after breaking of the means of fixation to achieve active stretched state of the rescue device.

The frame of the device can comprise several flexible spokes and the connecting element. The flexible spokes are adjoined on one side to the connecting element, the connectors located between the adjacent flexible spokes, in doing so the connectors are located at some distance from the ends of the flexible spokes, the means of fastening the object to be rescued fastened to the connecting element and the buffer element adjoined to the connecting element on the other side with respect to the flexible spokes, in doing so the aerodynamic deceleration element fastened to the flexible spokes.

Preferably, each of the flexible spokes is curved sideways from the central axis of the device. The curved shape of the flexible spokes provides a greater repulsive force of the device and correspondingly, a greater moving away of the device, a high probability of correct shaping of the fly-away trajectory, and, as a result, a high reliability level of the device and a high probability of a safe landing.

Preferably, the buffer element is embodied as several inflatable spokes fastened to the connection element and directed oppositely to the flexible spokes and the non-stretchable or low-stretchable material is fastened to the ends of the spokes of the buffer device.

The non-stretchable or low-stretchable material fastened to the spokes of the buffer element do not allow the buffer element to become deformed with a loss of its buffer properties upon landing, i.e., it essentially provides a constant shape of the buffer element at the moment of landing, in doing so it has small weight that means less speed of descent and correspondingly, increasing of the reliability of the rescue device and the probability of the safe landing.

This problem is also solved by a method for activation of the device comprising the frame to be filled with gas to which the aerodynamic deceleration element is fastened, at least one source to fill the frame with gas and the means of fixation of the rescue device in relation to the high-rise building consisting in blocking of the means of fixation of the rescue device in relation to the high-rise building and filling the frame with gas using at least the one source to fill the frame with gas; disconnecting of the means of fixation upon achievement of the determined degree of filling the carcass (frame) with gas.

Blocking of the means of fixation of the position of the object to be rescued and the means of rescuing in relation to the high-rise building and its subsequent breaking upon achievement of the determined degree of filling the rescue device with gas makes it possible to form a repulsive force of the device and thereby to impart a much greater momentum to the rescue device together with the object to be rescued.

This makes it possible to provide a greater distance from the high-rise building that means shaping of more safe fly-away trajectory and correspondingly, increasing a probability of a safe landing and the reliability of the device.

Additionally, the source to fill with gas can continue filling of the frame of the rescue device after disconnecting of the means of fixation to achieve active stretched state of the rescue device.

Preferably, the frame of the rescue device comprises several flexible spokes, the connecting element, in doing so the flexible spokes are adjoined on one side to the connecting element, the connectors located between the adjacent flexible spokes, in doing so the connectors are located at some distance from the ends of the flexible spokes and at the step prior to disconnecting of the means of fixation the flexible spokes rest against the wall of the high-rise building from outer side and the connectors form a perimeter which does not allow the flexible spokes to stretch into the active position.

It is also preferable that, upon filling the frame with gas after disconnecting of the means of fixation the rescue device assumes its final active shape.

Additional features and advantages of the invention will be set forth in the description that follows. Yet further features and advantages will be apparent to a person skilled in the art based on the description set forth herein or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF EMBODIMENTS OF THE INVENTION

Reference will now be made in detail to the embodiments of the present invention, examples of which are illustrated in the accompanying drawings.

The rescue device according to the present invention represents a free parachute system.

Figure 1:
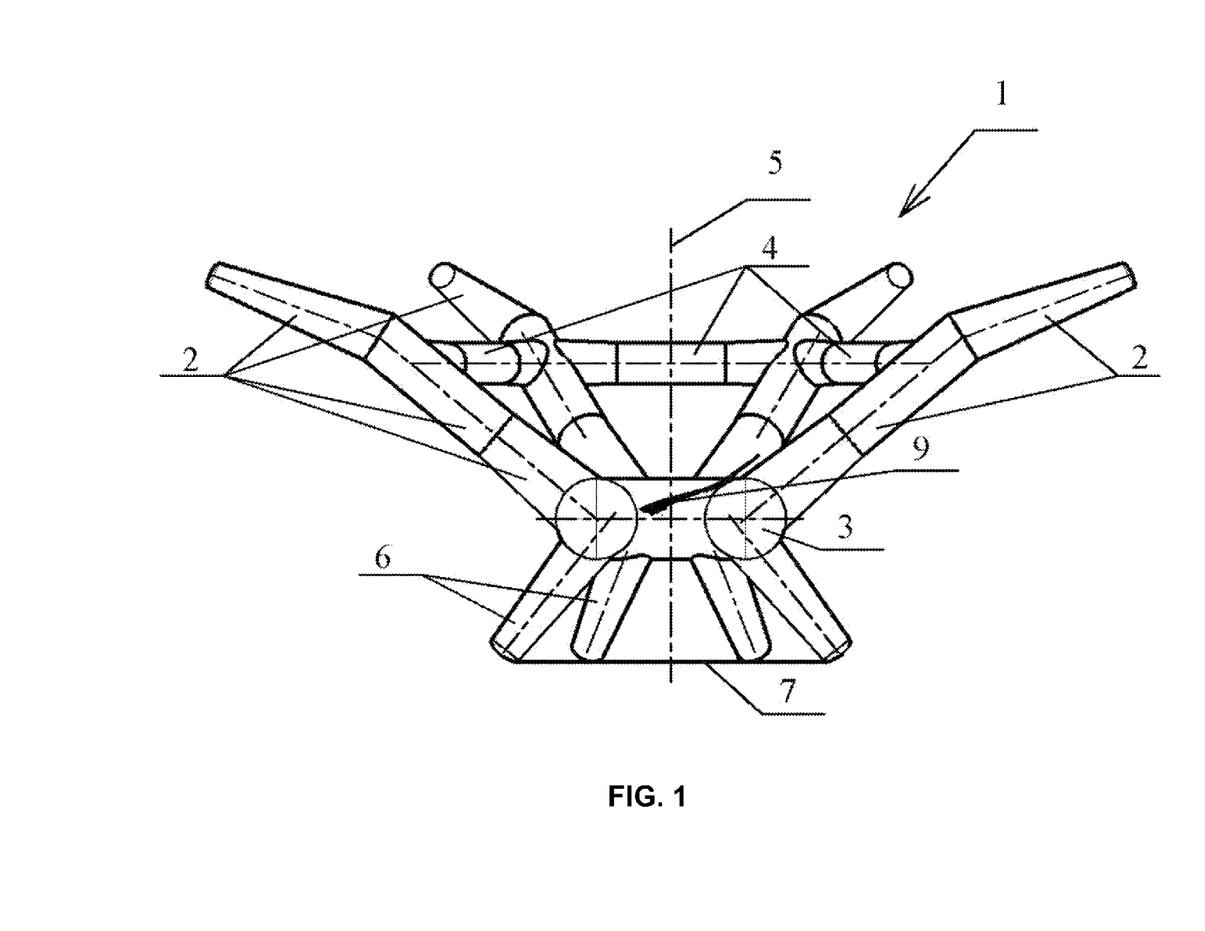
FIG. 1 shows a side view in section of a first embodiment of the invention.

As shown in FIG. 1, the rescue device 1 according to the first embodiment of the invention comprises several spokes 2. The spokes are embodied as resilient for bending.

As shown in FIG. 1, the rescue device 1 comprises six flexible spokes 2. The device can comprise any number of the flexible spokes 2, e.g., eight.

Each of the flexible spokes 2 is adjoined to a toroidal chamber 3. The toroidal chamber 3 serves as a connecting and force element.

Thus, all the flexible spokes 2 are interconnected through the toroidal chamber 3 on one end. The other end of the flexible spokes 2 remains free.

Connectors 4 are fastened between the adjacent flexible spokes 2.

The connectors 4 are fastened at some distance from the ends of the flexible spokes 2. Thus, the other free end of the flexible spokes 2 remains free.

The connectors 4 serve as an additional force element and provide rigidity of the rescue device 1, thereby they increase the reliability of the device 1.

According to the best embodiment of the invention the flexible spokes 2 are located on edges of a figure generally representing a truncated pyramid. In so doing, the toroidal chamber 3 corresponds to the lesser base of the truncated pyramid.

The flexible spokes 2 have one bend in the direction from the central axis of the device 5. The connectors 4 are located near the bend of the flexible spokes 2. Spokes 6 of a buffer element are fastened to the toroidal chamber 3 on the other side of the toroidal chamber 3 in relation to the flexible spokes 2.

The spokes 6 of the buffer element are embodied as diverged from one another in the direction from the toroidal chamber 3 towards their free ends. The toroidal chamber 3 serves as a basic connecting and force element of the device and represents one of the parts of the buffer element. Free ends of the spokes 6 of the buffer element are interconnected using non-stretchable or low-stretchable elements.

According to one embodiment of the buffer element non-stretchable or low-stretchable material 7 is fastened between the free ends of the spokes 6 of the buffer element. Use of non-stretchable or low-stretchable connecting elements provides retaining of a shape of the buffer element upon landing, in doing so it makes it possible to refuse using on the ends of the spokes 6 of the buffer element some toroidal chamber or connectors serving as a force element.

The non-stretchable or low-stretchable connecting elements, particularly the non-stretchable or low-stretchable material 7 serve as the force element. In doing so use of the non-stretchable or low-stretchable connecting elements, particularly the non-stretchable or low-stretchable material 7 provides reduction of the weight of the rescue device and correspondingly, increases its reliability and the probability of the safe landing.

According to the best embodiment of the invention all referred above elements of a frame of the rescue device 1 are embodied as inflatable, i.e., as to be filled with gas.

Figure 2:
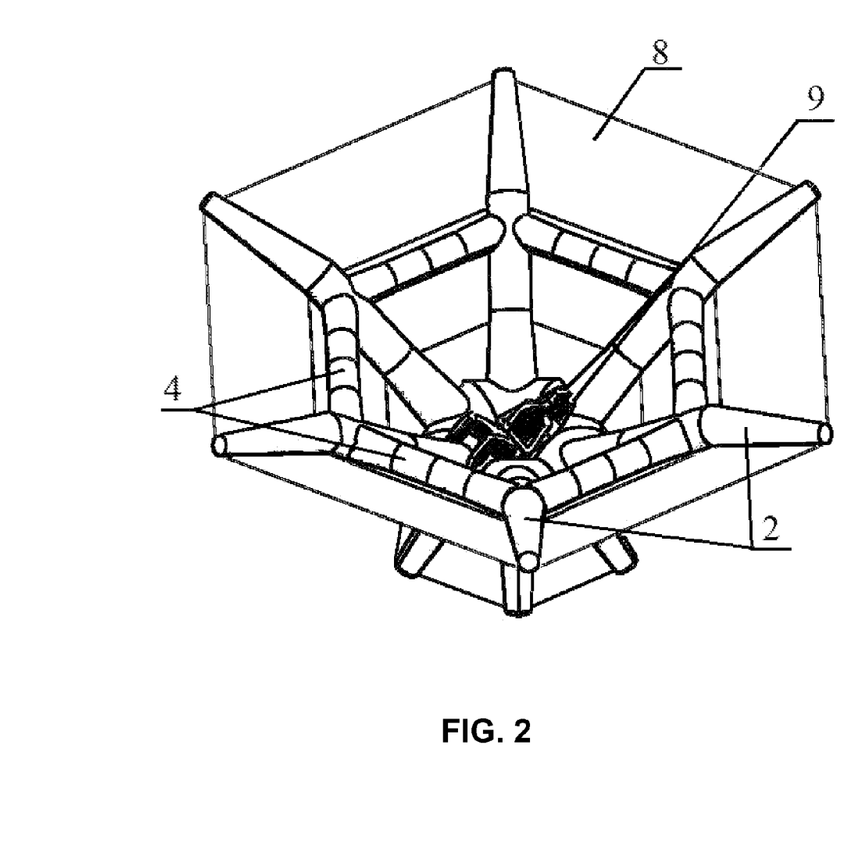
FIG. 2 shows an isometric view of the first embodiment of the invention.

As shown in FIG. 2, deceleration shields 8 are fastened between the adjacent flexible spokes 2. The deceleration shields 8 form an aerodynamic deceleration element of the device for rescuing 1.

As shown in FIG. 1, a cradle 9 intended for safe fastening of a person to be rescued is fastened to the toroidal chamber 3. Generally, the cradle 9 serves as a means of fastening of the person to be rescued.

Figure 3:
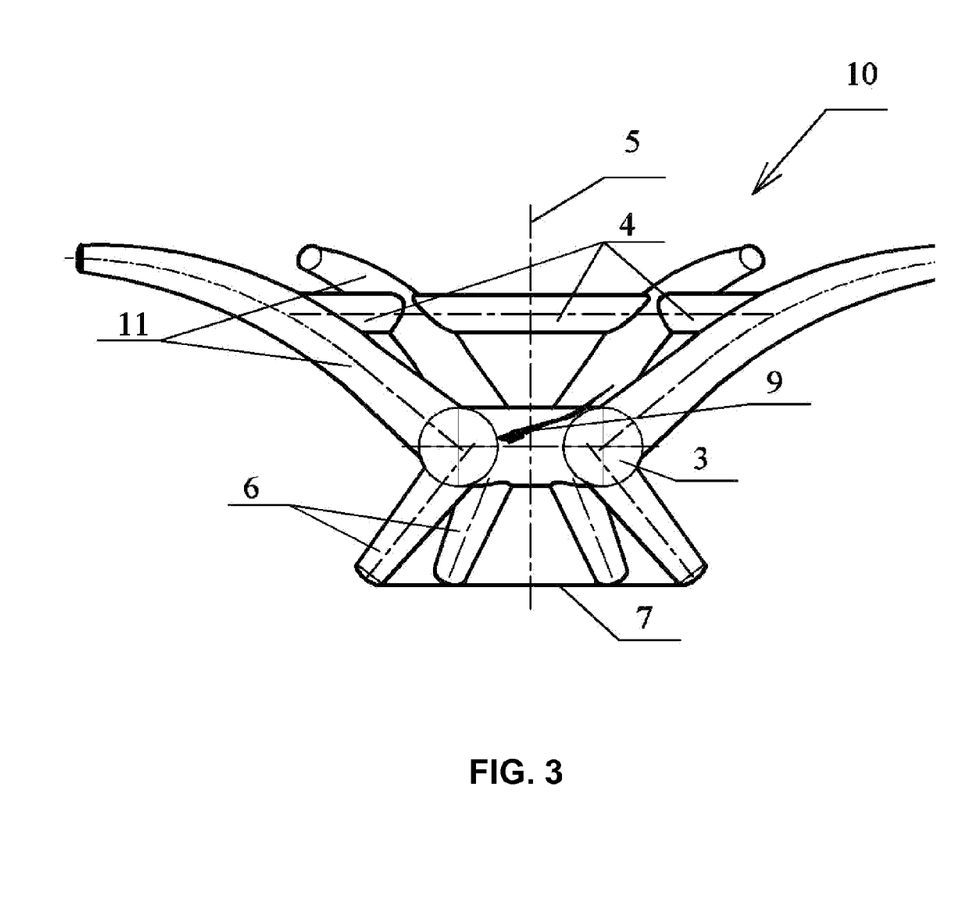
FIG. 3 shows a side view in section of a second embodiment of the invention.

The second embodiment of the invention is shown in FIG. 3. All the elements of a rescue device 10 are analogous to the respective elements of the rescue device 1 described with reference to FIG. 1 and FIG. 2 and they fulfill the same part. Flexible spokes 11 of the rescue device 10 do not have a bend but embodied as curved along the full length, as distinguished from the first embodiment of the invention. In doing so the direction of the bend is the same, notably—from a central axis 5 of the device.

Figure 4:
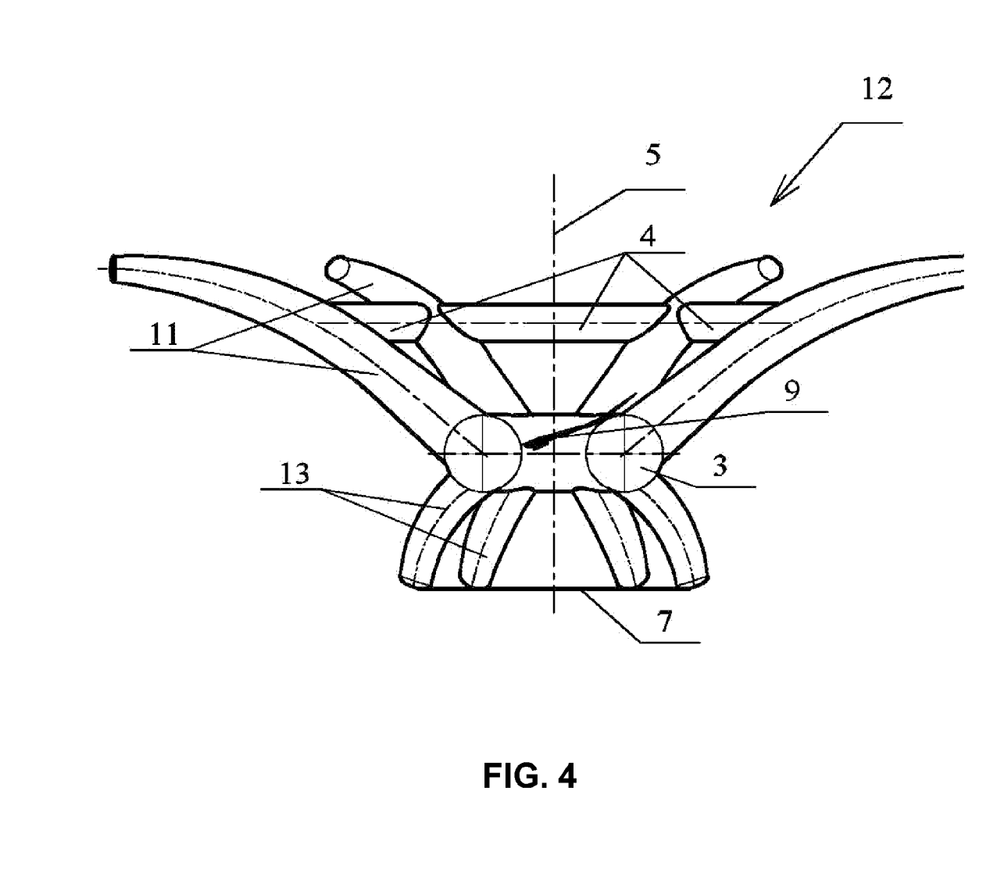
FIG. 4 shows a side view in section of a third embodiment of the invention.

The third embodiment of the invention is shown in FIG. 4. All the elements of a rescue device 12 are analogous to the respective elements of the rescue device 10 described with reference to FIG. 3 and they fulfill the same part. Spokes 13 of the buffer element are embodied as curved along the full length, as distinguished from the first and the second embodiments of the invention. The buffer element with curved spokes 13 better retains its shape upon landing.

Figure 5:
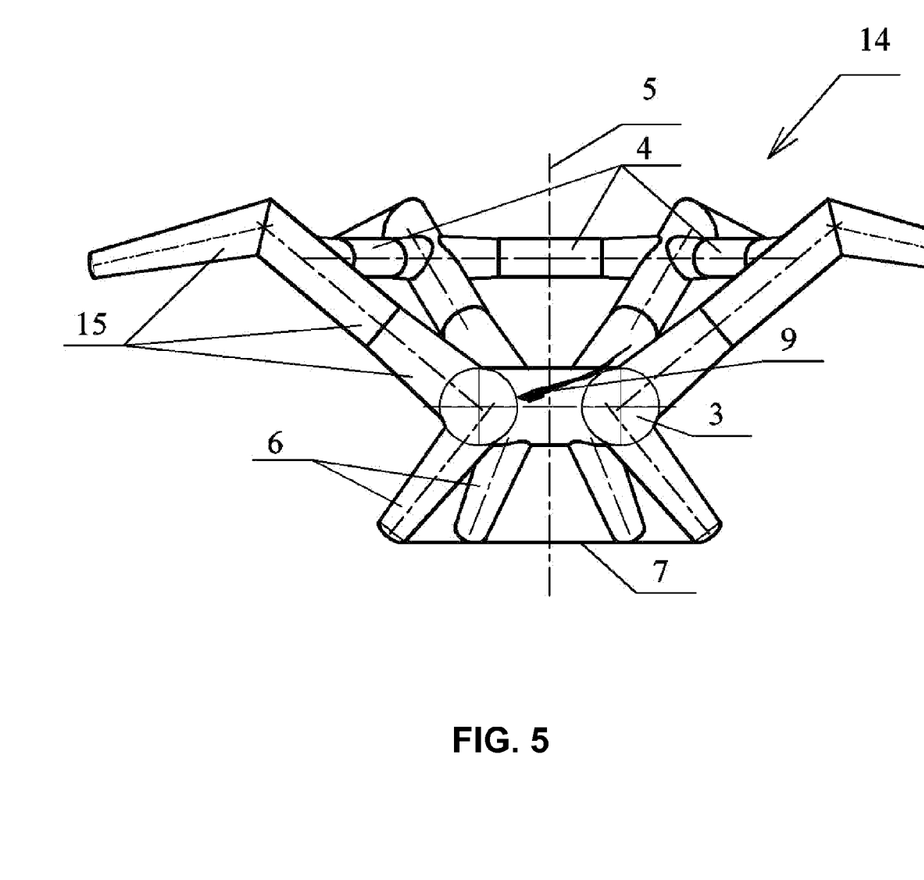
FIG. 5 shows a side view in section of a fourth embodiment of the invention.

The fourth embodiment of the invention is shown in FIG. 5. All the elements of a rescue device 14 are analogous to the respective elements of the rescue device 1 described with reference to FIG. 1 and FIG. 2 and they fulfill the same part.

Flexible spokes 15 of the rescue device 14 have a bigger bend, as distinguished from the first embodiment of the invention. The bend is such that free ends of the flexible spokes 15 are located below a point of the bend thereof. The direction of the bend is the same—from the central axis 5 of the device.

Figure 6:
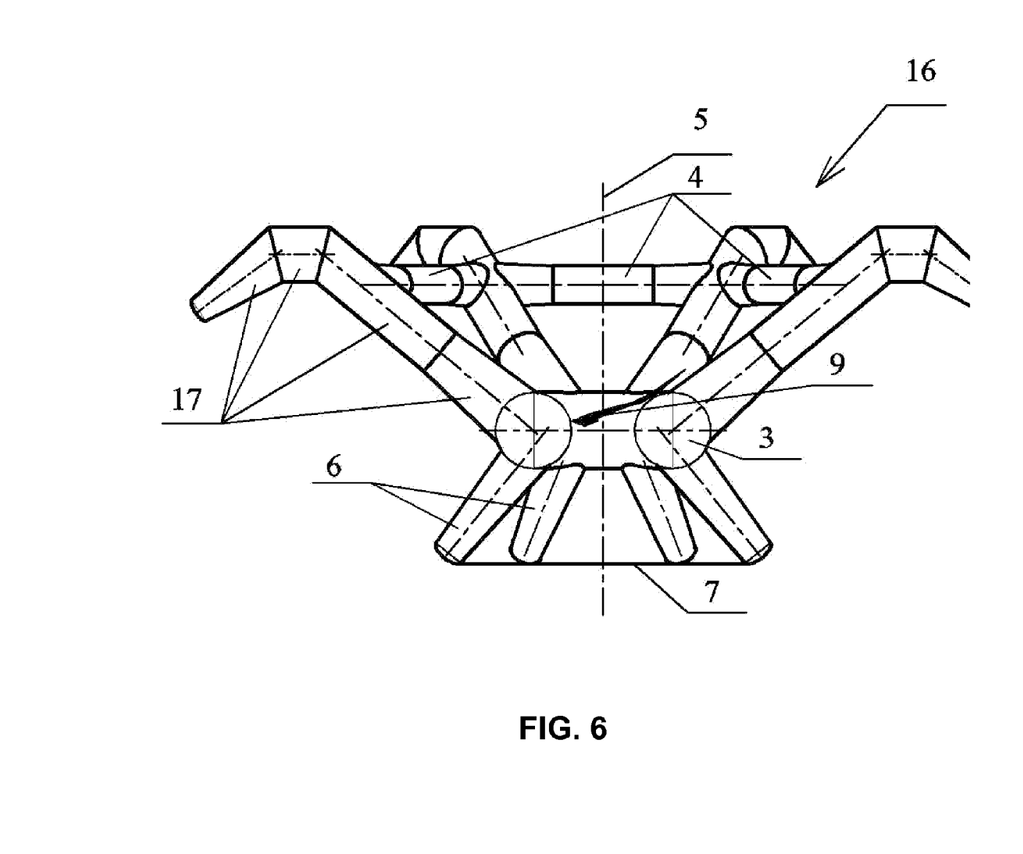
FIG. 6 shows a side view in section of a fifth embodiment of the invention.

The fifth embodiment of the invention is shown in FIG. 6. All the elements of a rescue device 16 are analogous to the respective elements of the rescue device 1 described with reference to FIG. 1 and FIG. 2 and they fulfill the same part. Flexible spokes 17 of the rescue device 16 have an additional second bend, as distinguished from the first embodiment of the invention. The bend is such that free ends of the flexible spokes 17 are located below a point of the second bend. The direction of the bend is the same—from the central axis 5 of the device.

It should be noted that the flexible spokes 6 according to any embodiment of the invention can be embodied as curved along the full length, analogously to the spokes 13 of the buffer element according to the third embodiment of the invention. The flexible spokes 2, 11, 15, 17, the toroidal chamber 3, the connectors 4 and the spokes 6, 13 of the buffer element form a frame of the rescue device from a high-rise building.

Figure 7:
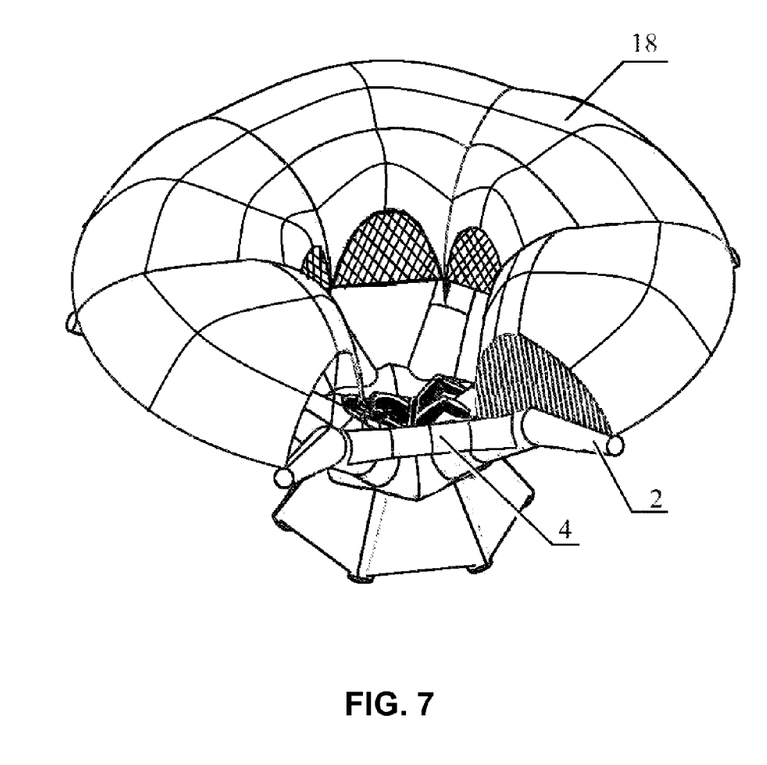
FIG. 7 shows an isometric view of the rescue device provided with domes.

As shown in FIG. 7, the rescue device can be provided with parachute domes 18 instead of the deceleration shields 8. The parachute domes 18 form an aerodynamic deceleration element of the rescue device. The parachute domes 18 can be used to form the aerodynamic deceleration element in any of the described above embodiments of the invention.

All the embodiments of the invention comprise at least one means to fill the device with gas. According to the preferred embodiment of the invention all the elements of the device to be filled with gas have one common volume that makes it possible to use one source of filling the device with gas and have one point of connection of the source of filling the device with gas with an interior volume of the device.

The isometric view of the rescue device 1 according the first embodiment of the invention is shown in FIG. 2. The isometric views of the devices for rescuing 10, 12, 14 and 16 according to the second, third, fourth and fifth embodiments, essentially are analogous to the isometric view of the first embodiment and they are not shown in the accompanied drawings. Differences between the isometric views and that presented in FIG. 2 are due to features in design of the devices 10, 12, 14 and 16 which are shown in FIGS. 3, 4, 5 and 6.

The rescue device in an active state is shown in FIGS. 1-7, i.e., when it is filled with gas to a determined pressure and stretched state. In an inactive state, the rescue device is not filled with gas.

The cradle 9 has a tethering system for safe fastening and fixation of a person or other object to be rescued. A person is attracted by the tethering system to the cradle 9 with the back. In the active state the rescue device represents a knapsack-container. The cradle 9 is a part of the knapsack-container and inside which the rescue device with all its systems is packed.

In so doing, as described above the cradle 9 is fastened to the toroidal chamber 3 to which all other elements of the device are fastened.

Any of the above embodiments of the invention operates as follows.

The rescue device has several states: an inactive assembled state, a pre-starting state, a starting state and an active state. Between the inactive state and the pre-starting state the following actions are performed. The rescue device is fastened on the back of the person or other object to be rescued using the tethering or some other system. Further, the object to be rescued is arranged at a starting position, notably at the edge of a high-rise building, in so doing the knapsack is arranged from the outer side of the high-rise building, e.g. in a window opening with the knapsack directed outside from the building.

Figure 8:
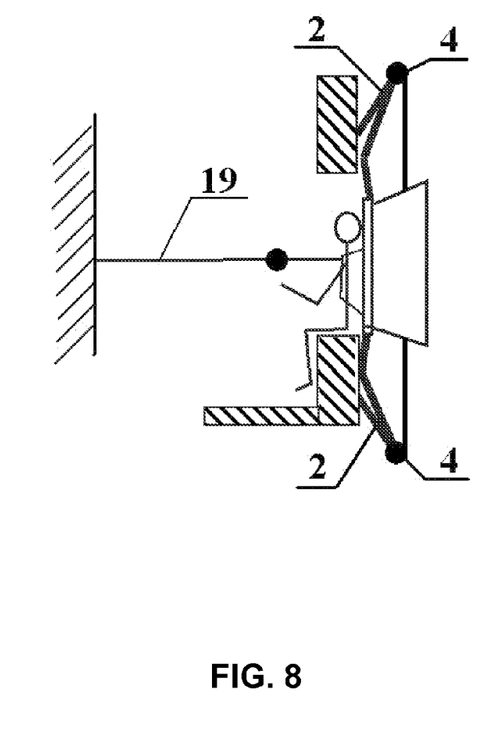
FIG. 8 shows the rescue device in a preflight state.

The device additionally comprises a starting tether 19, which is fastened to the rescue device and intended for fastening of the rescue device to the high-rise building. Preferably, the starting tether 19 is fastened to the high-rise building inside it opposite the starting position.

When arranged at the starting position, the starting tether 19 is blocked and initialization of the gas-filling source occurs. At least, lengthening of the starting tether 19 is limited. Opening of the knapsack-container is also performed.

Under a pressure of gas coming into the interior volume of the rescue device, the latter is stretched and turns into the pre-starting state.

In diagram form the present state of the rescue device is shown in FIG. 8.

Upon inflating and stretching, the device rests against a wall of a high-rise building from the outer side.

In doing so, the connectors 4 form a perimeter which does not allow the flexible spokes 2 to stretch into the active position as the starting tether 19 is blocked and does not allow the object to be rescued to move in the direction out of the high-rise building.

Consequently, as the rescue device is being filled with gas at the expense of resilient forces arising between the wall of the high-rise building and the elements of the rescue device, a repulsive force of the device increases.

On a determined degree of filling the rescue device with gas and correspondingly, achieving a determined internal pressure of the rescue device and a determined repulsive force of the device the rescue device turns into the starting state.

The starting tether 19 is disconnected in the starting state.

On disconnection of the starting tether 19 nothing holds the rescue device and the object to be rescued catapults from the high-rise building at the expense of the generated repulsive force of the device.

Using the starting tether 19 and its disconnection at the moment upon achieving the determined degree of filling the rescue device with gas and correspondingly, achievement of the determined internal pressure of the rescue device and the determined repulsive force of the device makes it possible to impart a much greater momentum to the rescue device together with the object to be rescued than without using it.

This makes it possible to provide a greater distance of moving away from a high-rise building that means shaping of more safe fly-away trajectory and correspondingly, increasing a probability of a safe landing and the reliability of the device.

On disconnection of the starting tether 19 the gas-filling source continues to operate. Consequently, all the elements of the rescue device are stretched in the active position of their own, i.e., the rescue device carries out a transition into the active state in the flight, notably at the step of shaping of the fly-away trajectory.

On assuming of the active state, the rescue device orients in relation to earth, stabilizes and descent at a determined speed is performed.

At the moment of landing remaining speed is damped by the buffer element.

Figure 9:
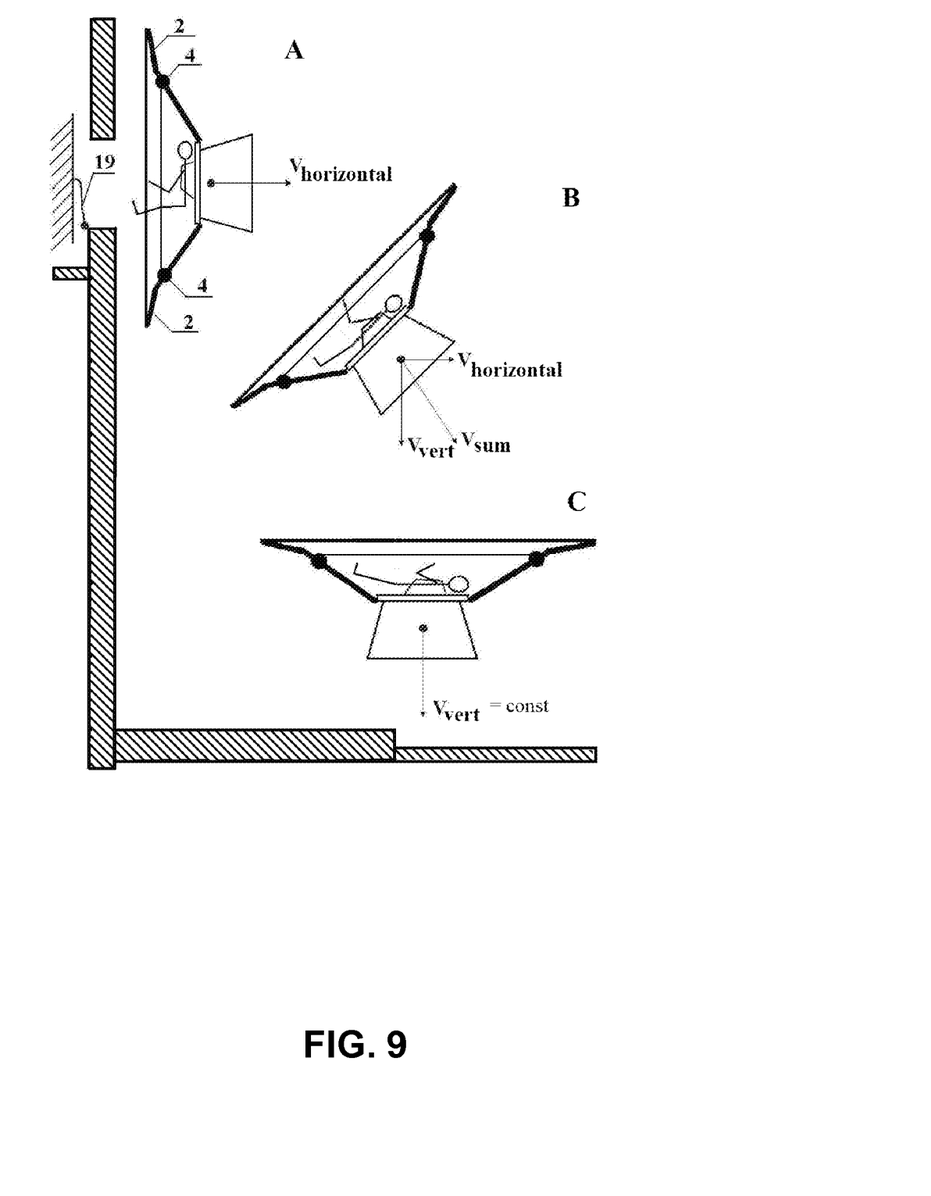
FIG. 9 shows stages of flight of the rescue device from the high-rise building.

The steps of the flight of the device are shown in FIG. 9.

In position "A" the rescue device on disconnection of the starting tether 19 is shown. The rescue device is at some distance from the high-rise building. The gas-filling source continues to operate. The elements of the device are stretched. Filling the device with gas to a required pressure occurs.

In position "B" aerodynamic orientation and stabilization of the rescue device occurs.

In position "C" descent of the rescue device at a constant steady speed of descent $V_{vert}$ occurs.

Figure 10:
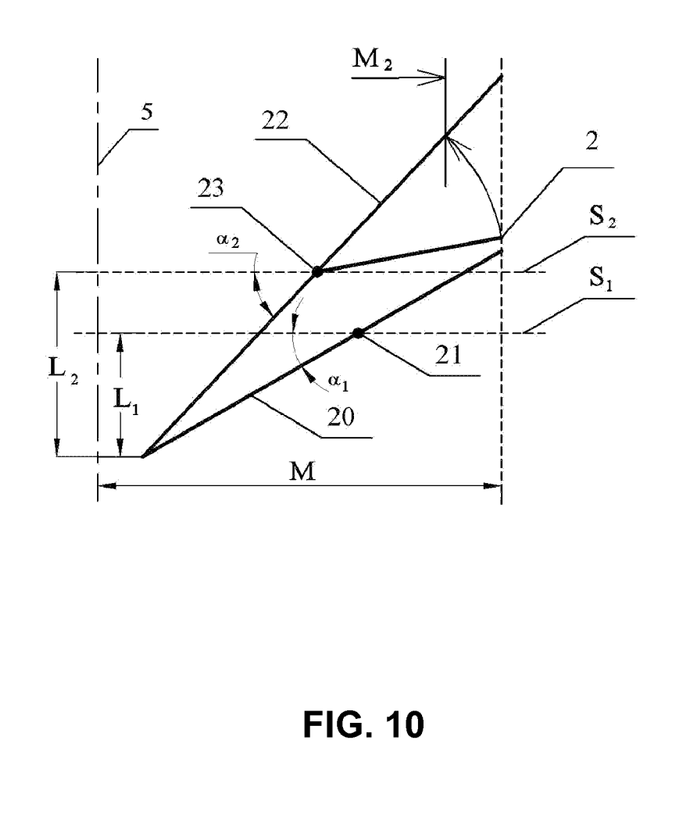
FIG. 10 shows a diagram of aerodynamic characteristics of the elements in the rescue device.

The diagram of aerodynamic characteristics of the elements in the rescue device according to the present invention compared to the known technical solution is shown in FIG. 10.

The flexible spokes of the known technical solution are denoted by position 20. A point of fastening the connectors between the adjacent flexible spokes is denoted by position 21.

A distance L determines the repulsive force of the device which can be achieved at the step of filling the rescue device prior to disconnection of the starting tether 19.

The greater the distance L, the greater is the achieved effort. Moreover, the greater angle $\alpha$ between the resilient for bending spoke and a wall of the high-rise building, the greater is the accumulated effort. The wall of the high-rise building is denoted by position S.

A distance M which represents a distance from the central axis of the device to free end of the resilient for bending spoke is of great importance. The present distance determines a midship of the rescue device. The greater the midship of the rescue device, the lesser is the speed of descent, all other things being equal and correspondingly, the greater is the probability of the safe landing.

The flexible spokes of the same known technical solution wherein the angle $\alpha$ has been increased are denoted by position 22. The point of fastening the connectors between the adjacent flexible spokes is denoted by position 23. It is evident that the distance L has been also increased that means a possibility to generate a greater repulsive force of the device and correspondingly, a possibility of shaping better fly-away trajectory and a greater moving away from the high-rise building.

However, a distance $M_2$ and correspondingly, the midship of the rescue device will be lesser that means a greater speed of descent and decrease in the probability of the safe landing.

To increase the midship of the rescue device it is necessary to increase the length of the flexible spokes. However, it will also result in increase of the weight of the rescue device and correspondingly, increasing of speed of descent and decrease in the probability of the safe landing.

According to the present invention the flexible spokes 2 are embodied as curved in the direction from the central axis of the rescue device. In the present case it is provided an additional repulsive force of the rescue device which is analogous to the effort with the flexible spokes 22, in doing so the midship of the rescue device and its weight are the same as the midship and the weight of the device comprising the flexible spokes 20 that provides increasing of the reliability of the rescue device, shaping of better fly-away trajectory and increase in the probability of the safe landing.

Figure 11:
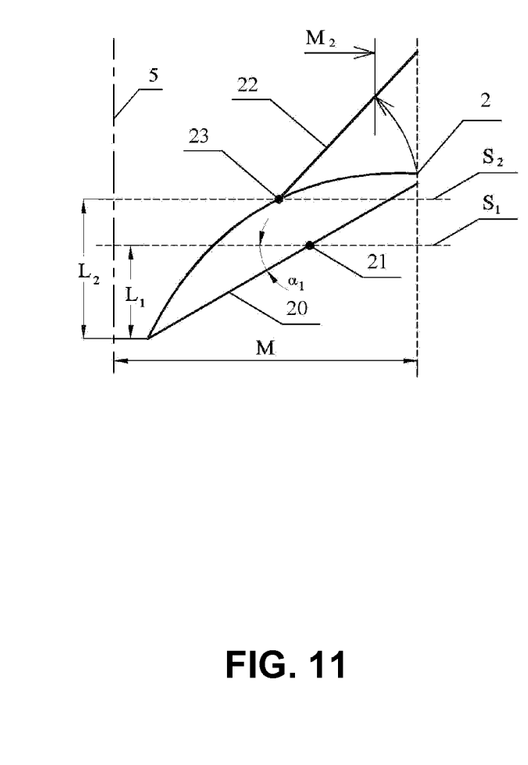
FIG. 11 shows a diagram of aerodynamic characteristics of the elements in the rescue device with the spokes curved along the full length.

The diagram of aerodynamic characteristics of the elements in the rescue device according to the present invention comprising the flexible spokes 11 which are curved along the full length compared to the known technical solution is shown in FIG. 11. All the aspects of the present embodiment of the invention are analogous to those described with reference to FIG. 10.

In the present case it is also provided the additional repulsive force of the rescue device which is analogous to the effort with the flexible spokes 22, in doing so the midship of the rescue device and its weight are the same as the midship and the weight of the device comprising the flexible spokes 20 that provides increasing of the reliability of the rescue device, shaping of better fly-away trajectory and increase in the probability of the safe landing.

Having thus described a preferred embodiment, it should be apparent to those skilled in the art that certain advantages of the described method and apparatus have been achieved. It should also be appreciated that various modifications, adaptations, and alternative embodiments thereof may be made within the scope and spirit of the present invention. The invention is further defined by the following claims.

What is claimed is:

1. A rescue device for rescue from a high-rise building, the rescue device comprising:
    a plurality of flexible spokes interconnected on one end to form a pyramid, wherein the spokes are located on the edges of the pyramid;
    an aerodynamic deceleration element attached to the spokes;
    connectors located between adjacent flexible spokes and located at some distance from the ends of the flexible spokes;
    a buffer element attached at a point of connection of the flexible spokes, and
    attachment elements for coupling a person to be rescued to the rescue device at the point of connection of the flexible spokes on the other side of the buffer element,
    wherein each of the flexible spokes is curved sideways from a central axis of the rescue device when the rescue device is fully inflated.

2. The device of claim 1, wherein the flexible spokes and the connectors are inflatable, and further comprising at least one gas-filling means to inflate the flexible spokes and the connectors.

3. The device of claim 2, wherein the flexible spokes and the connectors have a single common interior volume.

4. The device of claim 1, wherein the aerodynamic deceleration element includes deceleration shields attached to the flexible spokes and located between the adjacent flexible spokes.

5. The device of claim 1, wherein the aerodynamic deceleration element includes parachute domes attached to the flexible spokes and located between the adjacent flexible spokes.

6. The device of claim 1, wherein the flexible spokes are interconnected through a connection element in a form of a toroidal chamber,
    wherein the buffer element is formed of a multiple inflatable tubular elements attached to the connection element and directed opposite to the flexible spokes, and
    wherein ends of the inflatable tubular elements of the buffer element are interconnected using non-stretchable or low-stretchable connecting elements.

7. The device of claim 6, wherein the non-stretchable or low-stretchable connecting elements are attached to the ends of the inflatable tubular elements of the buffer element.

8. The device of claim 6, wherein the connecting element is inflatable, and all the inflatable elements of the rescue device have a single common volume and the rescue device additionally comprises at least one gas-filling means to inflate all the inflatable elements.

9. A rescue device for rescue from a high-rise building, the rescue device comprising:
    a plurality of flexible spokes;
    a connecting element, wherein the flexible spokes are adjoined on one side to the connecting element;
    an aerodynamic deceleration element attached to the flexible spokes;
    connectors located between the adjacent flexible spokes, wherein the connectors are located at a distance from the ends of the flexible spokes;
    an attachment element to attach a person to be rescued coupled to the connecting element, and
    a buffer element adjoined to the connecting element on opposite side of the flexible spokes,
    wherein each of the flexible spokes is curved sideways from a central axis of the rescue device when the rescue device is fully inflated.

10. The device of claim 9, wherein the aerodynamic deceleration element includes deceleration shields attached to the flexible spokes between the adjacent flexible spokes.

11. The device of claim 9, wherein the aerodynamic deceleration element includes parachute domes attached to the flexible spokes between the adjacent flexible spokes.

12. A rescue device from the high-rise building comprising:
    a plurality of flexible spokes;
    a toroidal chamber, wherein the flexible spokes are adjoined on one side to the toroidal chamber;
    an aerodynamic deceleration element attached to the flexible spokes;
    connectors located between the adjacent flexible spokes, wherein the connectors are located at some distance from the ends of the flexible spokes;
    a fastener for an object to be rescued attached to the toroidal chamber;
    a buffer element coupled to the spokes and adjoined to the toroidal chamber on an opposite side of the flexible spokes,
    wherein each of the flexible spokes has at least one curve sideways from a central axis of the rescue device when the rescue device is fully inflated and the connectors are located near the corresponding bends; and
    a non-stretchable or low-stretchable material attached to the ends of the flexible spokes of the buffer element.

13. The device of claim 12, wherein the flexible spokes, the connectors, the toroidal chamber and the spokes of the buffer element represent inflatable elements and additionally comprises at least one gas-filling means to fill the inflatable elements with gas.

14. The device of claim 12, wherein the flexible spokes, the connectors, the toroidal chamber and the spokes of the buffer device have a single common interior volume.

15. The device of claim 12, wherein each of the flexible spokes has two bends away from a central axis of the rescue device, and wherein the connectors are located near a closest bond to the toroidal chamber.

16. A rescue device for rescue from a high-rise building, the rescue device comprising:
    a frame fillable with gas and in an inflated state when filled with gas;
    an aerodynamic deceleration element attached to the frame;
    at least one source for filling the frame with gas; and
    a fixation means for fixing the rescue device to the high-rise building,
    wherein the fixation means is disconnectable from the high-rise building upon achieving a predetermined degree of filling the frame with the gas wherein the frame includes:
    a plurality of flexible spokes interconnected on one end, wherein each of the flexible spokes has at least one curve sideways from a central axis of the rescue device when the rescue device is fully inflated;
    an aerodynamic deceleration element attached to the spokes;
    connectors located between adjacent flexible spokes and located at some distance from the ends of the flexible spokes;

a buffer element attached at a point of connection of the flexible spokes, and fasteners for receiving an object to be rescued attached at the point of connection of the flexible spokes on the other side of the buffer element.

17. The device of claim 16, wherein the gas-filling source continues filling of the frame of the rescue device after disconnecting of the means of fixation.

18. The device of claim 16, wherein each of the flexible spokes is embodied as curved sideways from a central axis of the rescue device.

19. The device of claim 16, wherein the buffer element includes inflatable spokes attached to the connection element and directed opposite to the flexible spokes, and further including non-stretchable or low-stretchable material is attached to ends of the inflatable spokes of the buffer element.

* * * * *